Sept. 27, 1960 P. W. MARKS 2,954,234

RECORD PLAYER

Filed May 13, 1957 5 Sheets-Sheet 1

INVENTOR.
PHILIP W. MARKS

BY Kimmel & Crowell

ATTORNEYS

Sept. 27, 1960

P. W. MARKS 2,954,234

RECORD PLAYER

Filed May 13, 1957

5 Sheets-Sheet 2

INVENTOR.
PHILIP W. MARKS

BY Kimmel & Crowell

ATTORNEYS

Sept. 27, 1960 P. W. MARKS 2,954,234

RECORD PLAYER

Filed May 13, 1957 5 Sheets-Sheet 3

INVENTOR.
PHILIP W. MARKS

BY Kimmel & Crowell

ATTORNEYS

Sept. 27, 1960 P. W. MARKS 2,954,234

RECORD PLAYER

Filed May 13, 1957 5 Sheets-Sheet 4

INVENTOR.
PHILIP W. MARKS
BY
Kimmel & Crowell
ATTORNEYS

Sept. 27, 1960 P. W. MARKS 2,954,234

RECORD PLAYER

Filed May 13, 1957 5 Sheets-Sheet 5

INVENTOR.
PHILIP W. MARKS
BY Kimmel & Crowell
ATTORNEYS 2,954,234

RECORD PLAYER

Philip W. Marks, 620 Pine, P.O. Box 531, Klamath Falls, Oreg.

Filed May 13, 1957, Ser. No. 658,608

1 Claim. (Cl. 274—10)

This invention relates to record players having automatic record changers, and more particularly to such devices which are adapted for use in motor vehicles and the like.

My invention is an improvement on the invention described and claimed in the B. R. Carson U.S. Patent 2,732,212, which in turn is related to the E. J. Sperber U.S. Patent 2,706,639. In my drawings and specifications, I have illustrated the Carson construction with my improvements added thereto.

The primary object of my invention is to provide a record player having an automatic record changer, having means enabling the same to be used in motor vehicles and other movable objects where vibrations exist such as those caused by the movement of the vehicle over the road.

A further object of the invention is to provide a record player of the class described in which the automatic record changer thereof has means for holding the stylus of the needle arm in contact with the grooves of the record during road shock and the like.

Another object of the invention is to provide a record player and automatic record changer which is well adapted to be used in combination with an amplifier and speaker within one cabinet, the main feature being that it will operate on supporting objects of the type subject to vibration, such as vehicles, airplanes, boats, and can be used under all operating conditions of the support, either stationary or movable.

A still further object of the invention is to provide a case housing the record player and automatic record changing mechanism so that the entire unit can be installed in movable objects of the type subject to vibrations, and removed therefrom for stationary operations.

Another object of the invention is to provide a supporting bracket within a motor vehicle of a design on which to mount the record player and automatic record changer and its case securely within the vehicle while being used in the vehicle.

Other objects and advantages will become apparent in the following specification when considered in the light of the attached drawings, in which:

Figure 15 is a view similar to Figure 10 illustrating a modified form of bracket for supporting the instrument.

Figure 1:
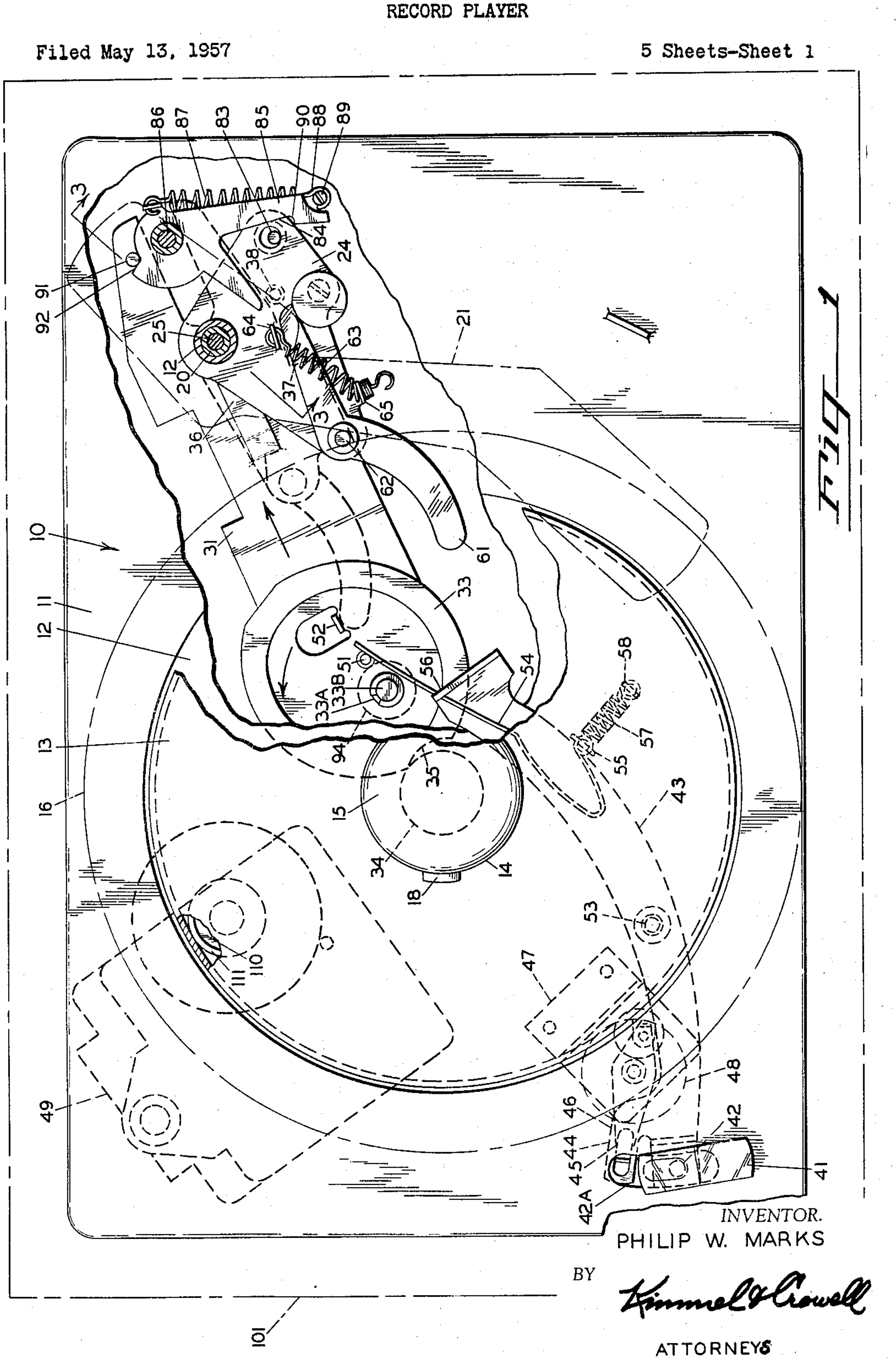
Figure 1 is a top plan view of the invention with parts broken away for convenience of illustration.

Referring now to the drawings in detail in which like reference characters indicate like elements throughout the several figures, the reference numeral 10 indicates generally the record player and changer which is provided with a motor board 11 having a turntable well 12 in which a turntable 13 is rotatably mounted. The turntable 13 carries a spindle 14 of relatively large diameter, to the top of which is fitted a cap 15 of the same diameter which receives a stack of records 16. The lowermost record 17 of the stack 16 rests on a pair of oppositely disposed supporting shoulders 18 which project from the body of the spindle 14 at the top thereof. A record 19 is shown carried on the turntable 13.

A tone arm 21 is pivotally mounted at one end thereof on a tone arm post 22, and the free end of the tone arm 21 carries a sound reproducing pick-up device (not shown) which is provided with a stylus 23 for engaging the sound grooves of the record 19. A bushing 20 extending through the tone arm post 22 mechanically couples the tone arm 21 and a trip lever assembly plate 24 about the tone arm post 22. The tone arm 21 is provided with an elevating rod 25 located within the bushing 20 and extending below the trip lever assembly plate 24, providing a suitable arrangement for raising and lowering the tone arm 21.

Record changing apparatus including the shoulders 18 and a pair of record separating blades (not shown) are housed in the center spindle 14. Such record changing apparatus is operable by a shaft 26 which extends from below the turntable well 12 up into the spindle 14 between the shoulders 18 and such separating blades. The shaft 26 rotates with the spindle 14 between record changing cycles and is adapted upon being stopped, while the spindle 14 and turntable 13 continue to rotate, to effect the operation of the record changing apparatus in a well known manner, as by camming or forcing the separating blades out to support the records above the lowermost record 17 of the stack 16 and permitting the shoulders 18 to be withdrawn inside the spindle 14 to let the lowermost record 17 drop to the turntable 13 in position to be played.

A movable record change cycle control slide element 31 mounted for horizontal sliding movement transversely to the axis of the shaft 26 between downwardly extending arms of a U-shaped guide member 32 fixed to the bottom of the turntable well 12, has a cam 33 eccentrically mounted thereon to rotate on a pivot sleeve 33a about a fixed pivot shaft 33b secured to the slide 31. A knurled roller 34 which rotates with the turntable 13 and spindle 14 is mounted concentric with the shaft 26 adjacent the bottom of the turntable well 12.

Between record changing cycles, or during the normal playing of a record, the knurled roller 34, which projects through an opening provided in the control slide 31, rotates in a cut-away portion 35 of the cam 33 in a neutral inoperative position of the cam 33. A record changing cycle is started when slight rotation of the cam 33 occurs and the knurled roller 34 engages the outer peripheral edge of the cam 33, as indicated in Figure 1. When this occurs, continued rotation of the knurled roller 34, and consequent rotation of the cam 33, effects sliding movement of the control slide 31, whereupon the tone arm 21 is raised by the elevating rod 25 riding up an incline 36 pressed in the control slide 31, and rotated outwardly about the tone arm post 22, by virtue of engagement of a member 37 located on the control slide with a downwardly projecting stud 38 (Figure 1) fixed to the trip lever assembly plate 24 and located in the path of member 37.

In accordance with the invention, to provide means for imparting movement to the cam 33 to initiate a record change cycle, a slidable control knob or button 41 on top of the motor board 11 is provided with a pin 42 which extends through a small elongated slot 42*a* in the motor board 11 and which is fixed to a start-reject lever 43. The lever 43 extends into and across the turntable well 12 to a point adjacent the eccentric trip cam 33.

A portion 44 of the start-reject lever 43 below the control knob 41 is provided with a slot 45 in which is located one end of a small lever 46 pivotally mounted on a plate 47 fixed to the bottom of the turntable well 12. The free end of the small lever 46 is adapted upon movement of the control knob 41 to manipulate a power switch 48 for operating a motor 49 which drives the turntable 13 at a relatively low speed.

The cam 33 is provided with a pair of studs 51 and 52, of which the stud 51 projects from the plane of the cam 33 upward into the turntable well 12. The start-reject lever 43 projecting into the turntable well 12 is pivoted at a point 53 between its ends to the turntable well 12, and a spring wire 54 fixed to a lug 55 on the start-reject lever 43 projects through an open slot 56 in the upturned free end of the start-reject lever 43. A tension spring 57 having one end fixed to the turntable well 12 at 58, and having its other end fixed to the lug 55 on the start-reject lever 43, is employed to bias the start-reject lever 43 so as to prevent the spring wire 54 from engaging the stud 51 during normal playing operations.

When it is desired to initiate a record changing cycle, as when the turntable 13 is first set into rotation, or when during the playing of a record 19 it is desired to play a succeeding record 17, the control knob 41 is moved to the position shown in Figure 1, to cause the start-reject lever 43 to move about its pivot 53 against the biasing force of the tension spring 57 and urge the spring wire 54 into contact with the end of the stud 51 which projects up into the turntable well 12 thereby to move the cam 33 sufficiently to effect a record changing cycle as hereinbefore described.

The spring wire arrangement for tripping the eccentric cam is preferred as it provides sufficient resilience to prevent damage to the stud 51 and to the cam mechanism, when the spring wire 54 strikes the stud 51 to urge the cam 33 into engagement with the knurled roller 34.

For automatic operation, a trip lever 61 pivotally mounted on the trip lever assembly plate 24 as indicated at 62, and pivotally movable therewith about the tone arm post 22, is provided with a small tension spring 63 connected between two vertical lug projections 64, 65 fixed respectively to the trip lever 61 and the trip lever assembly plate 24. Since the trip lever 61 rotates with the trip lever assembly plate 24, it moves inwardly therewith as the stylus 23 and tone arm 21 follow the grooves of a record 19 inward in the usual manner. When the end of a record 19 is reached, the end of the trip lever 61 engages the stud 52 on the cam 33, which position of the trip lever 61 is shown in dotted lines in Figure 1, and effects the movement of cam 33 sufficiently to initiate a record changing cycle in the above described manner.

As in the case of the start-reject lever 43, a desired degree of resiliency when the trip lever 61 strikes the stud 52 is provided by the small tension spring 63.

The eccentric cam 33 is a common element and is connected with either trip mechanism only momentarily. Thus both tripping functions, manual and automatic, are independent, one of the other, and do not interfere with normal operation of the record changer.

Figure 2:
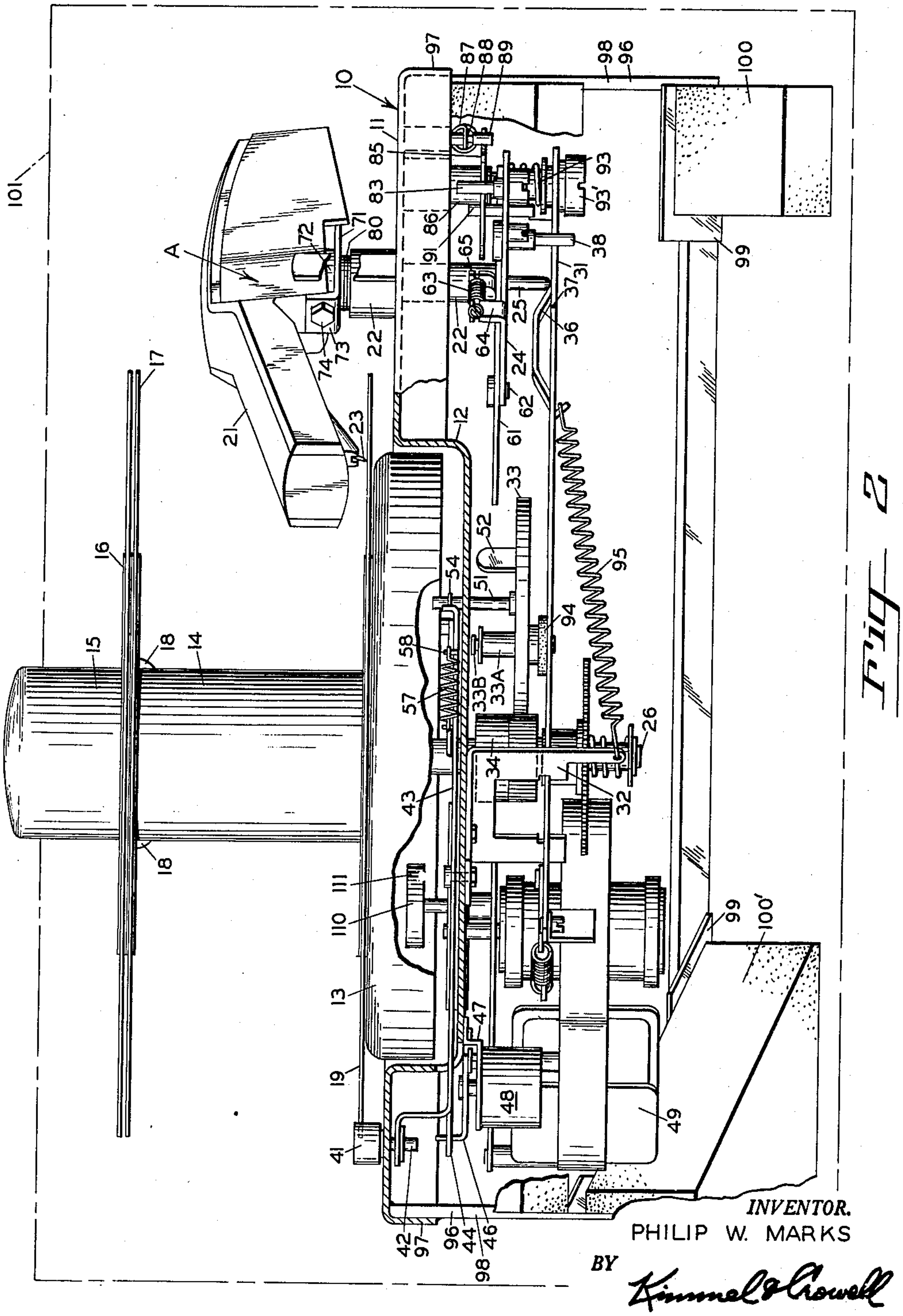
Figure 2 is a front elevation of the invention with parts broken away for convenience of illustration.

Figures 1 and 2, and the above description are substantially the same as the B. R. Carson U.S. Patent 2,732,212. For the operation of the record releasing mechanism within the spindle 14, see the E. J. Sperber U.S. Patent 2,706,639.

The present invention will now be described. Several alterations and adjustments are to be made in the above described record player in order to adapt the same to be used in vehicles and the like where vibration is taking place.

Figure 3:
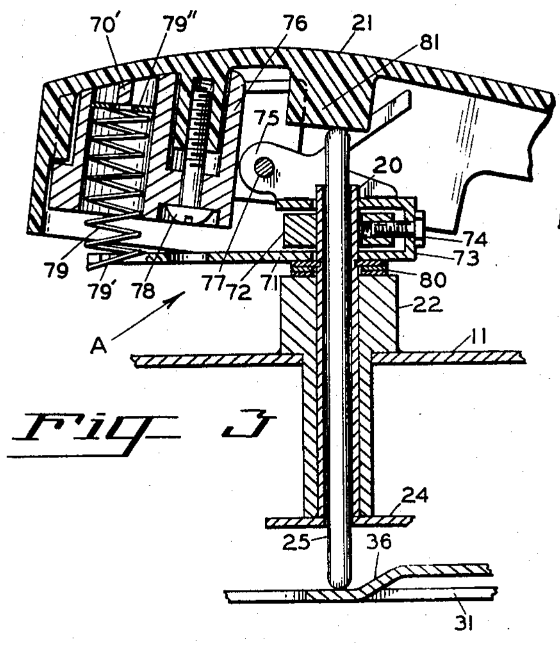
Figure 3 is an enlarged fragmentary sectional view taken on the line 3—3 of Figure 4, looking in the direction of the arrows.
Figure 5:
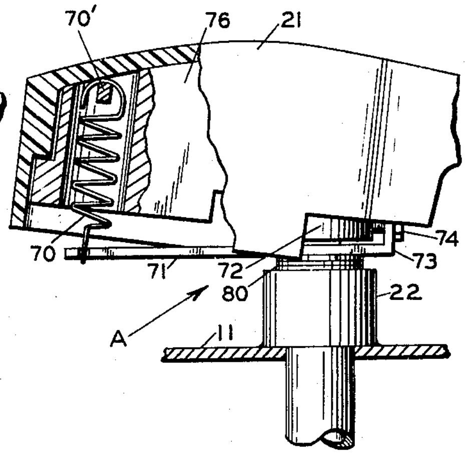
Figure 5 is a view similar to Figure 3, partially broken away, illustrating the prior art structure before my alterations have been made.
Figures 4, 7:
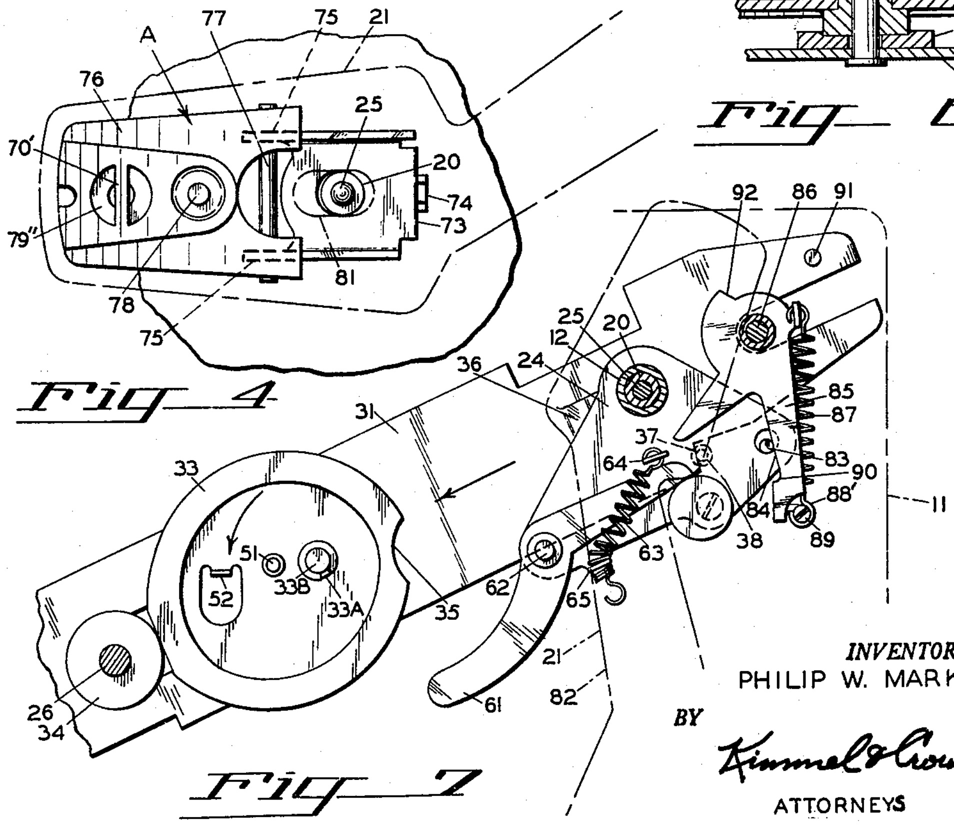
Figure 4 is a plan view of the tone arm supporting mechanism with the arm indicated by broken lines.
Figure 7 is an enlarged fragmentary plan view of the control slide, illustrating its operating cam in position for lifting and removing the tone arm from over the record.

Referring to Figures 3, 4 and 5, the tone arm 21 is pivotally supported on the tone arm supporting assembly A, permitting the tone arm 21 and stylus 23 to raise up and down. The tone arm assembly A includes a base plate 71, which is supported on the upper end of the bushing 20 and held in a fixed position by a locking collar 72.

The base plate 71 has a reverse bend 73 formed thereon and is apertured to permit the bushing 20 to pass therethrough, as best illustrated in Figure 3. The locking collar 72 is inserted between the reverse bend portion 73 and is locked to the upper end of the bushing 20 by the set screw 74, thereby holding the tone arm 21 in a predetermined adjusted radial position in reference to the vertical bushing 20, the object of which will be explained later on.

A further part of the tone arm assembly A consists of a base 76, which is pivotally connected by the cross shaft 77 to the upwardly extending arms 75, which forms part of the base plate unit 71. The tone arm 21 formed of plastic material is secured to the pivotally mounted base 76 by the cap screw 78.

Referring to Figure 5, a portion of the weight of the stylus of the tone arm 21 is supported by the tension spring 70. One end of the spring 70 is secured to the base plate 71 of the tone arm supporting head assembly A. The opposite end of the spring 70 is secured to the cross bar 70′ forming part of the pivotally mounted tone arm base 76.

The above description of the tone arm supporting assembly A describes the assembly as it now is in the record changer where the record changer is being used on a solid non-vibrating foundation. I will now describe the alterations to be made within the tone arm assembly A to adapt the same to be used in motor vehicles or in places where considerable vibration takes place. In order to prevent the stylus 23 from jumping out of the record grooves under these conditions, the spring tension 70 is exchanged for the spring 79, referring to Figure 3, which is a compression spring adapted to put a greater pressure on the stylus 23, tending to hold the same in the record grooves, an entirely different purpose than the purpose of spring 70 as now used. The spring 79 is fixedly secured at 79′ to the base 71 by suitable means, as by soldering, and has its upper end bearing under a disk 79″, which in turn bears against the underside of the cross bar 70′ of the base assembly 76. The spring tension of the spring 79 has to be adjusted so as not to put too much pressure on the stylus 23, but just enough to hold it in the groove of the record 19.

In replacing the action of the spring 70 by that of spring 79, it has been found necessary to raise the tone arm assembly A slightly above the tone arm post 22. This is done by adding shim washers 80 between the base plate 71 and the top of the post 22. This further stabilizes the operation of the stylus 23 within the record grooves. The shims 80 also prevent up and down play which cannot exist in this present adaptation of the record player.

Referring to Figures 1 and 2, the record player 10 is illustrated wherein the tone arm 21 has been lowered on the beginning of the record 19. The cutaway portion 35 of the cam 33 being in alignment with the knurled driving roller 34. The cycle control slide 31 being in inactive and record playing position.

Referring particularly to Figures 1, 2 and 7, when the tone arm 21 is carried by its stylus 23 to the end of the record 19 towards the record spindle 14, the trip lever assembly plate 24 will have been rotated therewith through the bushing 20, moving the trip lever 61 to the dotted line position in Figure 1, engaging the upwardly extending stud 52, which forms part of the cam 33. This will rotate the cam 33 in the direction of the arrow, by causing the point 35' of the cutaway portion 35 to engage the knurled roller 34. When this happens the cam 33 will be revolved forcing the cycle control slide 31 in the direction of the arrow, or to the position shown in Figure 7.

When this action takes place, referring to Figure 2, the inclined surface 36 will engage the lower end of the tone elevating rod 25, raising the same. The upper end of the rod 25, referring to Figure 3, engages the boss 81 forming part of the tone arm 21, raising the arm 21 about its pivot point 77, lifting the stylus 23 from the record.

As the cycle control slide further progresses by the action of the cam 33, the shoulder 37 formed thereon will engage the downwardly extending stud 38. The stud 38 forms part of the assembly plate 24. On further movement of the operating slide 31, the plate 24 will be revolved, together with the bushing 20, which in turn will move the tone arm to the broken line position 82, Figure 7.

Before the operating slide 31 reaches its full travel, an upwardly extending stop 83, forming part of the trip lever assembly plate 24, will engage the edge 84 of the lever 85. The lever 85 is pivotally mounted to the stud bolt 86, which is fixedly secured to the motor board 11. The lever 85 is biased towards the movement of the stop 83 by the action of the spring 87 connected thereto at one end and having its other end anchored at 88 to the stud 89, which is fixedly secured to the motor board 11.

The object of the biasing of the lever 85 against the stop pin 83 is to prevent back-lash or forward movement of the tone arm 21 as it is being moved to the dotted line position, Figure 7, by the action of the cycle control slide 31, and also to return the tone arm 21 to starting position when the control slide 31 is returned to its starting position.

When a new record 19 has been dropped on the turntable 13 and the cam 33 is revolved further by the action of the knurled roller 34, the cycle control slide 31 will be returned to the position shown in Figures 1 and 2. The tension of the spring 87 will bias the lever 85 against the pin 83, revolving the trip lever assembly plate 24, bushing 20, tone arm 21 to its proper point for dropping the stylus 23 on to the beginning of the record 19.

In this movement the stop pin 83 will be engaged by the hook portion 90 of the lever 85, preventing further movement of the tone arm assembly A until the cycle control slide 31 reaches its initial inactive position as shown in Figures 1 and 2. Just before reaching its full return travel, the pin 91, forming part of the slide 31, will engage the shoulder 92 of the lever 85, disengaging the hook portion 90 from the stop pin 83, stopping the rotating movement of the cam actuator plate 24, together with the tone arm 21. At the very last part of the return movement of the slide 31, the inclined surface 36 will have allowed the elevating rod 25 to lower the stylus 23 on to the start of the groove of the record 19.

The above described action already exists in this record changer, but the tension of the spring 87 is not sufficient to bias the proper pressure against the lever 85 and the stop pin 83 to prevent any sudden sway of a vehicle from causing a backlash or movement to the tone arm assembly A, therefore one of the other changes that has to be made in this record player is to adapt it to playing records in moving vehicles is to increase the tension on the spring 87. This tension must be increased sufficiently to bring tone arm 21 into playing position, but not enough to cause the stylus 23 to rake across the record 19 should the reject control button 41 be used before the record 19 that is playing has completed its cycle.

Another change it has been found to be necessary is to replace the tone arm 21 height controlling tension spring 93 with a shorter or weaker spring 93, due to the fact that the control slide 31 has to be raised or moved towards the elevating rod 25, when the shims 80 were brought into place for raising the tone arm 21 slightly required by the change of the action of the spring 79. The incline or cam 36 has to be raised to raise the tone arm 21 a sufficient height to operate properly. The present spring 93 of the record player 10 is of such a length that it will not permit the control slide 31 to be raised high enough to accomplish the above result by the tightening of the adjusting nut 93', therefore this spring 93 must be shortened or weakened.

Figure 6:
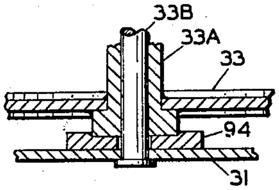
Figure 6 is an enlarged fragmentary sectional view, taken on the line 6—6 of Figure 2, looking in the direction of the arrows.

One of the most important alterations or additions to be made is to supply a friction washer 94, referring to Figures 1, 2 and 6, between the control slide 31 and the cam wheel 33. The object of this friction washer 94 is to prevent sudden jolts or jars causing the cam 33 to engage the driving knurled roller 34, which would cause an undesired cycle of record change to take place. Without a friction or a means of causing a friction between these two elements, the cycle would be set into operation at the slightest jar or movement of the record player 10. This is an addition and not an alteration. I have found that a felt washer 94 works very well for offering this resistance to the movement of the cam 33.

The braking action of the cam 33 makes it necessary to increase the spring tension exerted by the spring 63 against the trip lever 61 in order to set up a cycle of operation.

A further alteration required is to increase the tension on the spring 95 for returning the cycle control slide 31 to its starting position. Due to the above alterations of the record player 10, it requires slightly more spring tension in the spring 95 to return the control slide 31 to its starting position. While some of these alterations may seem very unimportant, yet if they are not made the record changer will not work properly where vibration and jolting take place in a motor vehicle.

The physical mounting of the record player 10 will now be described. It has been found that tilting the base 11 of the record player 10 at an angle to a horizontal assists in the stabilizing of the pick up arm 21 in its operation under various road conditions, such as when applying the brakes suddenly, or when running over rough places. In order to do this, legs 96 in the form of plates, are welded or otherwise secured to the flange 97 of the motor board base 11. The upper ends of the legs 96 being formed on an incline to the horizontal bases 98. Secured to the bases 98 by corner plates 99 are resilient feet 100 and 100'. The foot 100' is of a larger area than the other foot 100 due to the greater weight carried at this point within the record player 10.

The record player 10 is mounted within a special case 101, the feet 100 and 100' resting on the bottom 102 of the case 101, preferably fixedly secured thereto by suitable means, as for instance glue. The upper portion of the case 101 is preferably left open, as at 103 and 104, but a special removable covering could be applied to this part of the case 101.

When the record player is mounted on an incline, it has been found that the speed of the turn table 13 is slightly reduced, therefore it becomes necessary to increase the diameter of the friction driving wheel 110 in order to make up this loss of speed, due to certain frictions set up within the bearing of the turntable 13 due to the inclining of the turntable 13. It also becomes necessary to increase the tension of the driving wheel 110 against the inner rim of the turntable 13. This is accomplished by increasing the strength of the tension spring used to move the friction wheel 110. This is accomplished by adding a relatively thin rubber covering or pad 111 to the outer surface of the driving wheel 110.

When the record player 10 is used in motor vehicles, a special base 105, preferably made up of angle iron, is secured to the forward wall 106 and to the floor board 107 of the driver's compartment, as best illustrated in Figures 8, 9, 10 and 11. Although I would not wish to be limited to any particular form of supporting means.

Figures 10, 11, 12, 13:
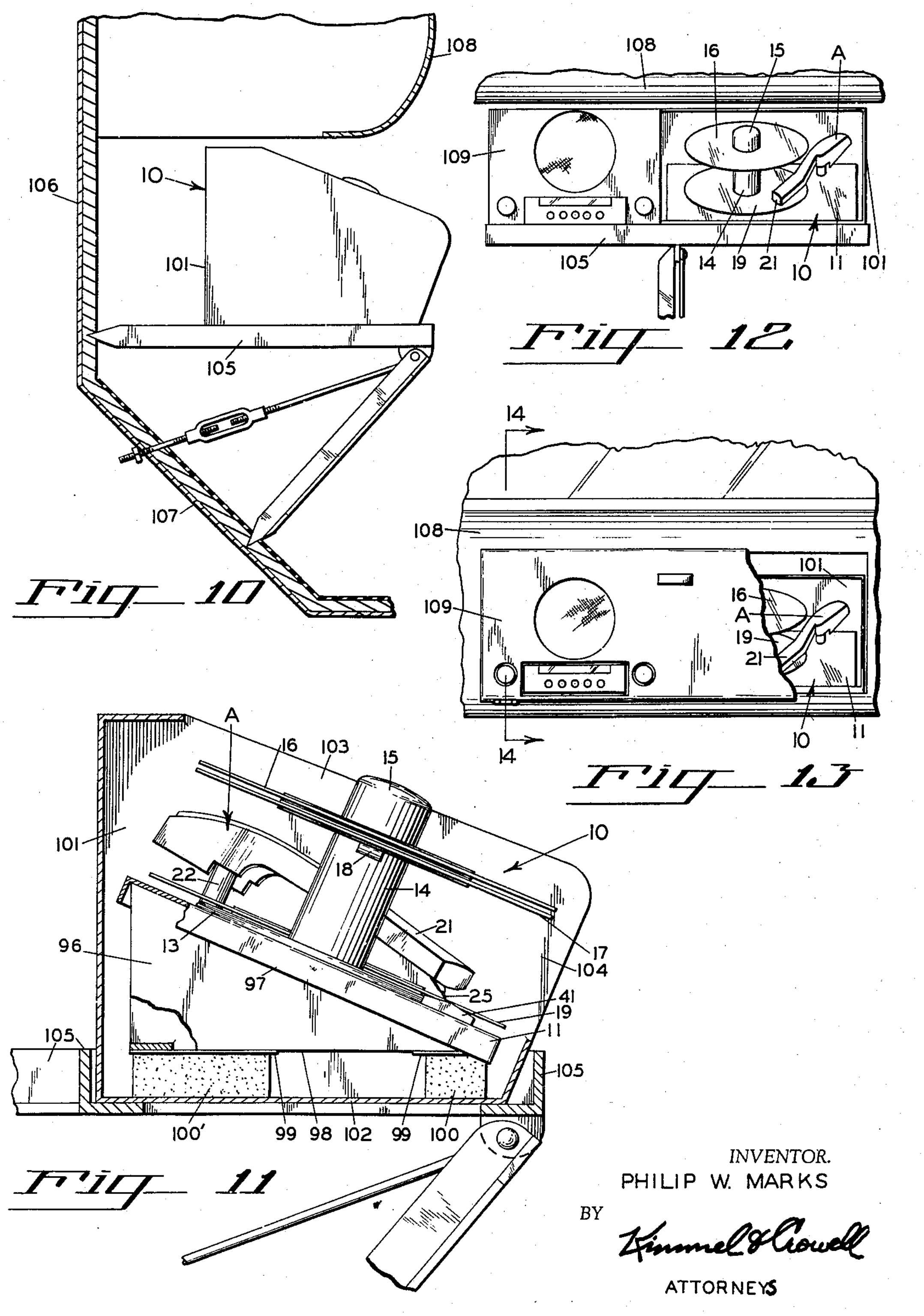
Figure 10 is a side elevation of the supporting bracket, record player, and its case, mounted within a motor vehicle, shown partially broken away and in section.
Figure 11 is a fragmentary sectional view of the case taken on the line 11—11 of Figure 9, looking in the direction of the arrows.
Figure 12 is a front elevation of the invention in combination with a special radio.

The record player 10 is especially adapted to be placed under the instrument panel 108 of the vehicle. Referring to Figure 12, a combination of the record player 10 and a radio 109 can be placed in the same container 101, which may be carried by the support 105 in the vehicle. Ordinarily this record player 10 is connected with already existing car radios, but it must be understood that it could be used with an independent radio or amplifier.

Figures 8, 9, 13, 14:
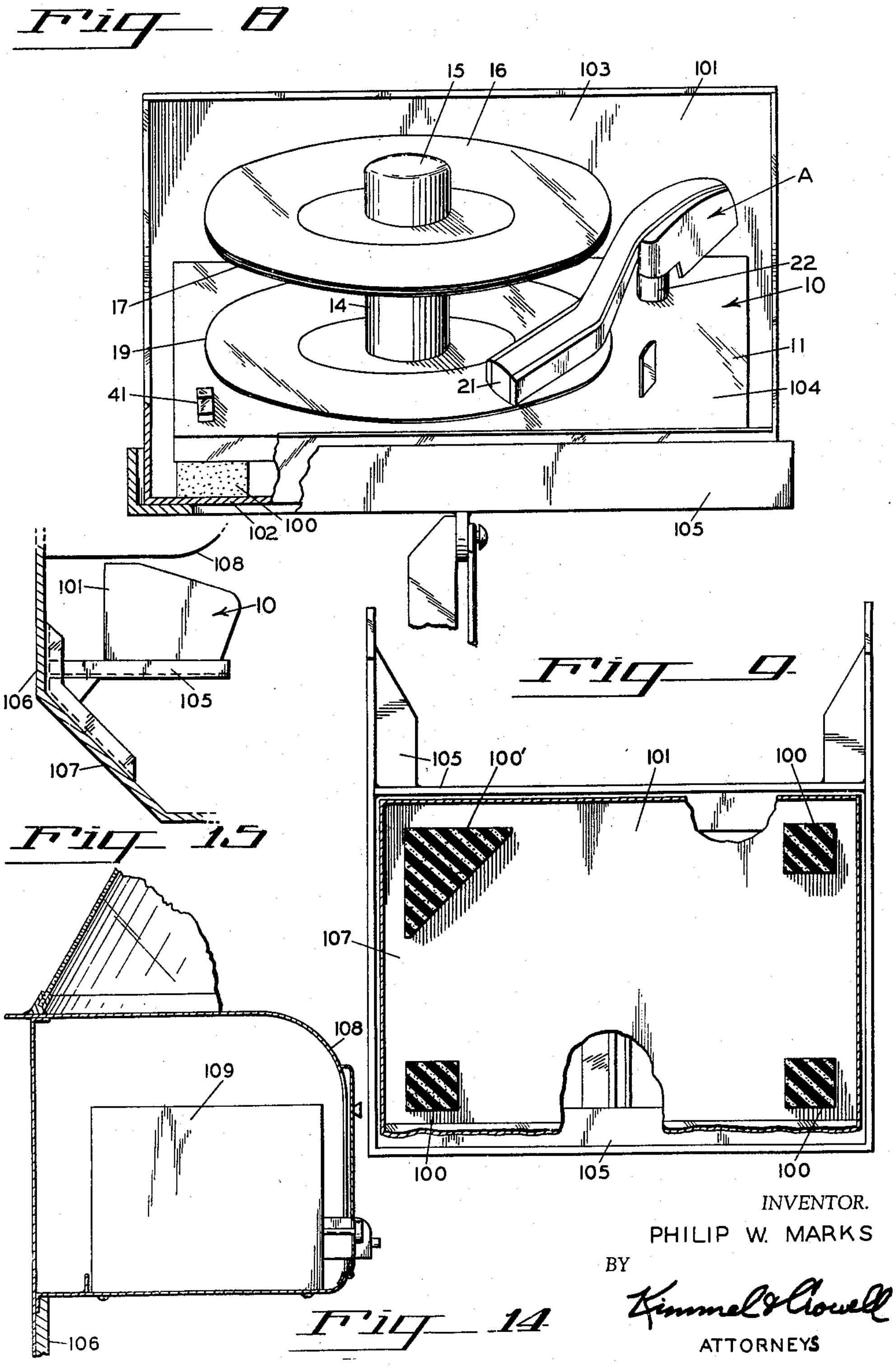
Figure 8 is a front elevation of the invention mounted within a holding case in a motor vehicle.
Figure 9 is a horizontal sectional view, taken along the line 9—9 of Figure 8, looking in the direction of the arrows.
Figure 13 illustrates a modified mounting of the combination record player and radio located within the instrument panel of a vehicle, parts broken away for convenience of illustration.
Figure 14 is a sectional view, taken on the line 14—14 of Figure 13, looking in the direction of the arrows.

Referring to Figures 13 and 14, it is illustrated how the record player 10 could be located in the beginning at the point of vehicle origin where the same would be located within the instrument panel as our present day radios are now located, but the complete combination of the record player 10 and special radio can be carried in the instrument panel.

One of the main objects of this record player 10 is to be able to remove the same from vehicles and use the same for stationary work wherever it is desired to use the same, therefore all combinations should be installed in a common container so that the same can be moved from place to place with ease.

Having thus described the preferred embodiments of the invention, it will be understood that numerous structural modifications and adaptations may be resorted to, without departing from the scope of the appended claim.

What is claimed is:

In combination in an automatic phonograph a motor board, a motor carried by said motor board, a power switch for controlling said motor, a turntable mounted on said motor board and driven by said motor, a control button for operating said power switch, a tone arm post mounted on said motor board, a base plate journalled on said tone arm post, a tone arm pivoted at one end to said base plate for movement across said turntable, a movable record change cycle control slide having a rotary driven cam therefor eccentrically mounted thereon for rotation from a neutral inoperative position to move the slide and initiate a record change cycle, means providing a first and second stud projection on said cam, a first resilient lever means coupled to said control button for movement in one direction to engage said first stud projection and actuate said cam to move from said neutral position whereby said control button effectively controls said motor and the record change cycle operation jointly, and a second resilient lever means coupled to said tone arm for engaging said second stud projection upon movement of said tone arm to a predetermined position automatically to initiate a record change cycle independently of said control button, a compression coil spring having one end engaged against said tone arm and the opposite end engaged against said base plate for biasing said tone arm into record contacting position, and a friction washer positioned between said slide and said cam for restraining said cam from rotation on said slide upon accidental vibration of said slide.

References Cited in the file of this patent

UNITED STATES PATENTS

| | | |
|---|---|---|
| 2,224,332 | Alsbrook | Dec. 10, 1940 |
| 2,331,122 | Jones | Oct. 5, 1943 |
| 2,489,146 | Loucheim | Nov. 22, 1949 |
| 2,732,212 | Carson | Jan. 24, 1956 |

OTHER REFERENCES

Audio, December 1955, pages 15–17 and 63 and 64. (Copy in U.S. Patent Office.)